(No Model.)
E. F. NORTHRUP.
GALVANIC BATTERY.
No. 520,120.                    Patented May 22, 1894.
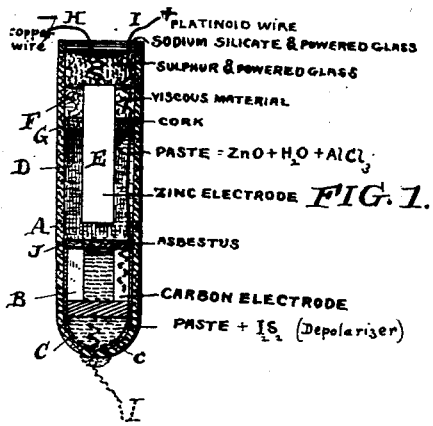
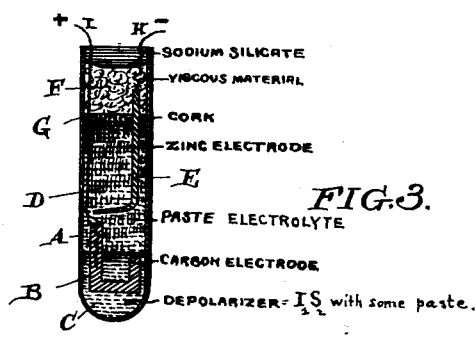
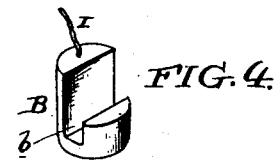
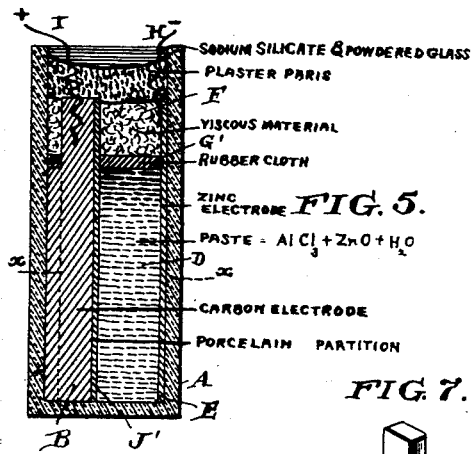
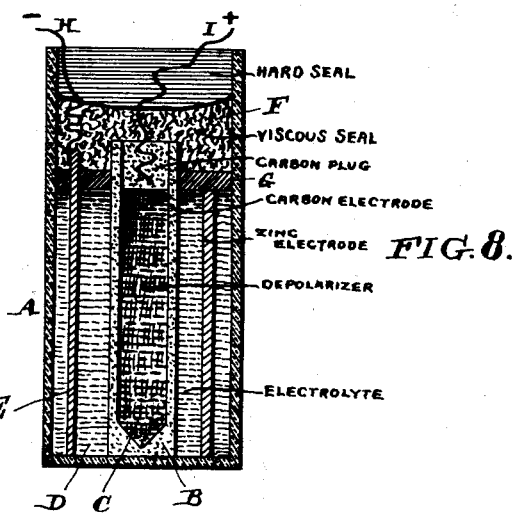
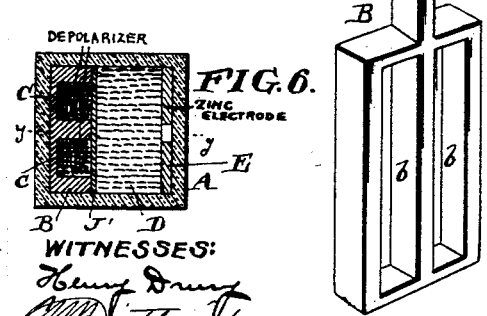
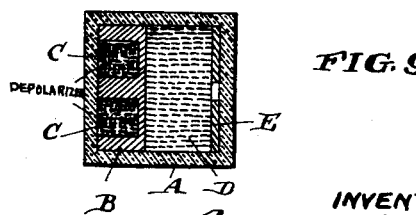
WITNESSES:
INVENTOR:
Edwin F. Northrup
By his atty

UNITED STATES PATENT OFFICE.

EDWIN F. NORTHRUP, OF ARDMORE, ASSIGNOR TO THE QUEEN & COMPANY, OF PHILADELPHIA, PENNSYLVANIA.

GALVANIC BATTERY.

SPECIFICATION forming part of Letters Patent No. 520,120, dated May 22, 1894.

Application filed February 18, 1893. Serial No. 462,841. (No model.)

*To all whom it may concern:*

Be it known that I, EDWIN F. NORTHRUP, of Ardmore, county of Montgomery, and State of Pennsylvania, have invented an Improvement in Galvanic Batteries, of which the following is a specification.

My invention has reference to galvanic batteries and consists of certain improvements which are fully set forth in the following specification and shown in the accompanying drawings which form a part thereof.

The invention comprehends certain improvements in galvanic batteries whereby their efficiency and life are made very great and they are able to produce a very strong and uniform as well as large current, at a high electro motive force when the battery is in use. The invention has particular reference to these improvements as applied to galvanic batteries belonging to the class known as "dry cells," though the improvements are applicable to other types of cells as well. The defects which have manifested themselves in "dry cells," such as are now on the market are several: First, inefficiency, which results from employing compounds for depolarizers which yield up a small portion of the whole mass only as the active element to perform the function of the depolarizer proper. Second, low electro motive force when the element which does the active depolarizing is held chemically bound by one or more other elements, as in the case of the AgCl cell, where it must first be torn away from the element or elements which hold it, and which remaining element is not very negative, before it can be joined to the hydrogen. Third, high internal resistance caused by the large quantity of dead or inactive material in the cell. Fourth, local action when the cell is not in use and consequently consumption of the materials before the full life of the cell is properly reached. Fifth, gasing, in the case of hermetically sealed dry cells, causing the cell to burst. If the cell is not hermetically sealed, evaporation will take place, the cell will soon dry up, and the internal resistance become so great that it is no longer capable of doing the work without replenishing, in which case it ceases to be a portable dry cell and is like any fluid battery.

This invention provides certain improvements by which the necessary high electro motive force is completely attained, an extremely active and concentrated depolarizer is used, and gasing is entirely prevented. The cell may consequently be hermetically sealed and kept for an indefinite time. If used, the current produced is almost absolutely uniform during the whole life of the cell, and the chemical constituents of the cell simply change their form until the cell is entirely used up without the slightest generation of gas.

My invention may be carried out in a variety of constructions of batteries, all of which embody the same general principles, and I have shown several types of the battery in the accompanying drawings, in which—

Figure 1 is a sectional elevation of my preferred type of battery cell. Fig. 2 is a perspective view of the negative electrode removed. Fig. 3 is a similar sectional elevation of a modified form of this cell. Fig. 4 is a perspective view of the negative electrode of the cell shown in Fig. 3. Fig. 5 is a sectional elevation on line $y$—$y$ (Fig. 6) of a type of battery embodying my invention specially adapted to physicians' induction coils. Fig. 6 is a transverse section of same on line $x$—$x$. Fig. 7 is a perspective view of the negative electrode of the battery shown in Figs. 5 and 6. Fig. 8 is a sectional elevation of a modified form of cell also embodying my invention; and Fig. 9 is a transverse section similar to Fig. 6 of a cell in all material respects the same as that of Figs. 5 and 6, but with the negative electrode reversed.

To make clear the character of the invention, the form of the cell shown in Fig. 1 will first be described. This cell is intended for portable use in making electrical measurements or to be used in small portable induction coils by physicians. The cell may be of any size, but, as shown, is two and five-sixteenths inches long by five-eighths of an inch in diameter.

I have, first, the containing case A, which may be made of glass, an ordinary chemical specimen tube being very suitable. For the positive electrode E, pure zinc, either amalgamated or unamalgamated, is preferable to use. Cadmium or any one of the list of the more positive metals could, however, be used. Zinc is most applicable, however, as it is the metal farthest separated from the negative end of the scale which will not decompose $H_2O$ or water. This zinc is preferably cylindrical in shape. The negative electrode, B, is of carbon, of a fairly porous variety. This carbon is preferably shaped so as to conform to the bottom of the tube and is cut by two slots $b$ about one-eighth of an inch wide at right angles to one another and one-fourth or one-eighth of an inch deep (see Fig. 2). The carbon electrode B is made in this shape for reasons which will hereinafter be explained. If desired, the electrode B may be rounded at the bottom as indicated at $c$ to fit the rounded bottom of the cell A. The depolarizer, C, used is iodine, either free, mixed, or chemically combined. This depolarizer when dry is ground into a powder and mixed with a small portion of the paste (to be hereinafter described) and placed in the bottom of the cell A around the carbon B and in the slots thereof but not quite as high as the top of the prongs of the carbon. The carbon having a great porosity acts like a wick of a lamp, carrying up into the prongs soluble portions of the depolarizer. The depolarizer is insoluble until after the cell is put in action. After a short time zinc iodide, ($ZnI_2$,) is formed, rendering the depolarizer slightly soluble. A portion of this now soaks up through the carbon B and depolarizes perfectly its exposed ends. If desired, a disk of asbestus J may be placed immediately above the ends of the carbon electrode, which permits the proper action of the battery and forms a medium which absorbs the depolarizer or electrolyte and permits the proper depolarization of the electrode B, without permitting too intimate contact between the depolarizer and the electrolyte proper.

That the carbon may be depolarized when the cell is first started, and that the air may be all driven out of the pores, the carbon electrodes are placed in a dish containing the depolarizer finely powdered and made into a thin paste with water. This dish is then placed under an air pump and the air exhausted. The air all comes out of the pores of the carbon and when the pressure of the atmosphere is restored, fine particles of the depolarizer are driven into the pores of the carbon. By this means perfect depolarization is secured from the first. As stated, iodine, free, mixed or chemically combined may be used as a depolarizer. I prefer, however, to use iodine chemically united to sulphur with a slight excess of sulphur. These when combined give the compound $I_2S_2$. I prefer to use this combination rather than free iodine since it is perfectly insoluble in the electrolyte of the cell. It is very necessary to keep the depolarizer undissolved, because if dissolved it will diffuse through the cell and finally come in contact with and attack the positive zinc electrode. This, however, is a matter of degree, and salts of iodine, such as $AgI$, $HgI_2$, $HgI_2$, &c., will operate but will not give as good results as $I_2S_2$. I may also use a mixture of iodine with a salt of iodine, or I with HgO, &c. But of all these I prefer iodine and sulphur prepared as follows: three parts by weight of iodine and one part by weight of sulphur are mixed together, and are then heated in a suitable covered vessel over a slow flame until they have become liquid and chemically united; and when the liquid is cool and has hardened into a solid it is covered with water and thoroughly ground to a powder in a mortar. A small portion of the paste, to be described later, may be mixed with this sulphur iodide for the purpose of increasing its electrical conductivity. I may, if I desire, mix the free iodine, or iodine compound, with powdered carbon in order to increase the conductivity of the depolarizing compound. The use of paste or powdered carbon also serves to keep the depolarizer a solid mass after the active part, the iodine, has become changed to a liquid.

As an excitant or electrolyte, D, I may use any of a great many compounds, but prefer a paste obtained by mixing ZnO with $AlCl_3$. The $I_2S_2$, or I+HgO is insoluble in this excitant, and the paste itself, which is formed by mixing ZnO with water and $AlCl_3$ is a smooth and homogeneous paste. The object of the paste is for the purpose of forming a semi solid mass which shall hold the depolarizer in place and may also be employed to keep the two electrodes apart. The object of the zinc oxide is to neutralize any acid formed in the cell. Hydrogen is the product of all galvanic action which takes place in an electrolyte containing water, and this, being depolarized by the use of iodine, forms HI, which is a powerful acid capable of dissolving the zinc electrode with evolution of hydrogen according to the equation $2HI+Zn=ZI_2+H_2$. But the action of the acid on ZnO or any other strong oxide base is to form a salt of the metal and water according to the equation $ZnO + 2HI = ZnI_2 + H_2O$. Instead of ZnO I might use MgO. All formation of gas is prevented by such a combination. This is a new feature in the construction of battery cells, and is one of the essential features of the invention. The improvement may be stated to comprehend the use of any base in an electrolyte cell which will combine with acid to form a salt and water.

The electrolyte paste, D, I prefer to employ is made thus: by weight, ZnO four parts, $AlCl_3$ three parts, water twelve parts, charcoal one part or $MnO_2$ three parts, mixed and well stirred. The paste should have a consistency which is about equal to new lard.

The use of any base which will act to combine with the acids HCl, HBr or HI, or any other acid generated in a closed cell so that such acid will not act upon the electrode of the cell and generate a gas, embodies one of the generic ideas of my invention.

I am accustomed to mix a little powdered charcoal with the paste to improve the appearance of the cell, also to increase the conductivity of the paste, but this, however, is not essential. I have in some cases mixed with the paste $MnO_2$ instead of charcoal. This is supposed to have a further effect in neutralizing the HI according to the equation $MnO_2 + 4HI = 2H_2O + MnI_2 + I_2$.

The zinc electrode, E, is held in place by a cork G. Above this cork is placed the seal F. The seal is composed of a layer of viscous material, and above it a plug of sulphur and finely powdered glass. The viscous material may be a mixture of gutta percha and pitch. Such a seal will have nearly the same coefficient of expansion as glass itself and consequently will remain permanently air tight. However, any suitable seal may be employed instead of that described.

The terminals H and L may leave the electrode from the top of the cell, or one from the bottom and one from the top, as may be preferred.

I would call particular attention to the fact that in many cells the depolarizer is placed about the negative electrode so that a considerable if not a larger part of the current passes through the depolarizer. This is the case in the well known "gravity" cell where the depolarizer consists of a solution of copper sulphate. In that cell, however, there is nothing disadvantageous in doing this, as such a solution of copper sulphate is a good conductor. In the well known "Le Clanche" cell, the depolarizer is $MnO_2$ which is not a particularly good conductor. This $MnO_2$ surrounds in some way the carbon electrode. Bromine or iodine either free or in combination could not nearly as advantageously be used in such a cell as a depolarizer, as their electrical resistance is very high and little or no current could get through them; nevertheless bromine and iodine, free or in combination, are two of the best depolarizers known. By the use of the porous properties of carbon, I am enabled to employ these very active depolarizers and yet not add materially to the resistance of the cell. In the cell embodying my invention, which has been described, this has been done by making the carbon a peculiar shape with portions projecting above or as high as the depolarizer.

Referring to Figs. 3 and 4 I have the same general character of battery cell as illustrated in Figs. 1 and 2, but the shape of the zinc and carbon electrodes is slightly different. This type of cell is usually made somewhat smaller than the type shown in Fig. 1. The asbestos or porous septum is omitted in this case. The similar letters of reference are employed in these figures for parts corresponding to those of Fig. 1. In this case there is but one notch $b$ in the carbon electrode, and one of the legs is shorter than the other, but this is not essential.

The construction shown in Figs. 5, 6, and 7, is a cell adapted for certain forms of physicians' induction coils where it is necessary to maintain a very large current for a long time. In this, the carbon, B, is shaped very much like a divided box with no lid. The depolarizer C is placed in the grooves or recesses $b$ of this box, and the box is placed in the glass cell A in the position shown. D is the electrolyte. E is the zinc electrode. J' is an unburned porcelain partition to keep the depolarizer separate from the electrolyte. If desired, it may be formed of asbestus or other material, as in the case of Fig 1. In place of the cork G of Figs 1 and 3, I employ a heavy rubber cloth immediately below the seal F. H and I are the terminals, as in the other cases. This cell in practice would be laid on its side so that the carbon electrode would be on the bottom. The depolarizer C flows through the carbon and depolarizes it at its surface as in the other cases. If desired, the carbon electrode B in this cell may be inverted, as indicated in Fig. 9. In this case the diaphragm J' might be omitted.

Another form of cell is that shown in Fig. 8 and contains a circular zinc electrode, E, surrounding a central carbon electrode B, which latter is made hollow or bored out and filled with the depolarizer C, which may be mixed, if desired, with charcoal or finely broken carbon. G is the cork partition which holds the two electrodes in proper relative positions, and F is the cell as above. Such a cell as this would have a very low internal resistance. In this cell the zinc electrode may also serve as the containing case.

Instead of using iodine as a depolarizer, I may in any of these cells use bromine, either free or in any combination. I prefer to use a mixture of bromine and $CS_2$ made up of five parts of the latter and three parts of the former, this mixture to be combined with carbon dust or charcoal dust or any good conducting absorbent until of a pasty consistency. I may if desired use free bromine or some chemical combination of bromine, such as $HgBr$, $HgBr_2$, $AgBr$, &c. The excitant and paste used in this cell are preferably ZnO and $AlCl_3$, as with the iodine cell.

The advantages claimed for my iodine and bromine cells may be stated as follows:

(First.) A very great amount of electro chemical energy comfined in a small space. This cell has after being run down but a minimum amount of waste material left.

(Second.) A very efficient depolarizer. As shown above, the depolarizer is the essentially active part of a battery and the greater the proportion of the free element, which does the depolarizing, in the depolarizer, the greater is the energy concentrated in a given space and the more efficient is the cell. Now iodine is held so loosely bound by sulphur, that, while it is rendered by the sulphur absolutely insoluble in the electrolyte before the cell has been run, it is most readily given up to the hydrogen, and hence the cell is very perfectly depolarized.

(Third.) Freedom from deterioration on open circuit. There is no local action going on in these cells, and hence they will last a very long time on open circuit.

(Fourth.) Freedom from gasing. This most annoying and destructive feature of closed cells now upon the market is entirely done away with. Hence these cells need no outside inclosing case as the commercial AgCl cells do; and many more can be placed in a given space than would otherwise be possible.

(Fifth.) Great current capacity for a cell of its type and very long life giving, in the (Fig. 3) smallest size two-tenths to three-tenths of an ampère hour.

(Sixth.) Low internal resistance. The internal resistance of these cells is very low for a cell of this type and further as the cell is used, the resistance decreases rather than increases, so that the cell will improve with use until the active material is exhausted. The average internal resistance of these cells is twenty-five to thirty ohms for a cell such as is shown in Fig. 1.

(Seventh.) High electro motive force. These cells have about 1.35 volts. A commercial AgCl cell at its best has but one volt, and usually only nine-tenths of a volt. Hence in testing work where one hundred AgCl cells would be required to furnish the necessary electro-motive force, only sixty-six of these cells would be needed.

(Eighth.) Small size. These cells are but about half the diameter of the smallest dry cells known and somewhat shortened. In a space that would contain twenty-five of the former, at least seventy-five of my smaller cells may be used, or as their electro-motive force is higher, both features combined will enable the same electro-motive force to be obtained from about three-thirteenths of the space required in the first case.

(Ninth.) Cheapness. A cell that makes use of such an expensive substance as silver chloride can never hope to be brought down to a reasonable price. The materials used in my improved cells all being of comparatively low price will enable the cells to be sold much cheaper than any chloride of silver cell can be sold for at a profit.

The chemical changes in my iodine cell as now made may be represented as follows:—
$Zn_x + MgCl_2 + 3H_2O + Br_2 + MgO + C = Zn_{x-1} + ZnCl_2 + 2Mg(OH)_2 + 2HBr + C$. Then the ZnO neutralizes the 6HI thus: $3ZnO + 6HI = 3ZnI_2 + 3H_2O$. After the cell has been some time in action, the $ZnI_2$ becomes greater in amount. This salt renders the iodine somewhat soluble, and the cell also has more water in it. The effect of this is to make the resistance decrease. There is some diffusion upward of the dissolved iodine, but not sufficient to cause any serious injury to the cell.

The chemistry of the bromine cell is:—
$Zn_x + 2AlCl_3 + 6H_2O + 3Br_2 + 3ZnO + C + CS_2 = Zn_{x-3} + 3ZnCl_2 + 2Al(OH)_3 + 6HBr + 3ZnO + C + CS_2$. If in the paste and excitant MgO and $MgCl_2$ are used in the bromine cell, then we have: $Zn_x + MgCl_2 + 2H_2O + Br_2 + C = Zn_{x-1} + ZnCl_2 + Mg(OH)_2 + 2HBr + C$.

I have shown several types of the detailed construction of my improved galvanic cell and wish it to be understood that I do not confine myself to the mere details of construction as these may be greatly modified without departing from my invention.

What I claim as new, and desire to secure by Letters Patent, is—

1. In a galvanic cell, the combination of the holding vessel, with a positive electrode and a negative electrode, and electrolyte paste containing a base, capable of producing hydrogen and an oxide base by reactions within the cell, a depolarizer in contact with the negative electrode consisting of sulphur iodide or equivalent substances which with the hydrogen and oxide base will form a compound incapable of further reaction within the cell, and a seal for sealing the entrance to the containing vessel.

2. In a galvanic cell, the combination of the holding vessel, with a positive electrode, a negative electrode consisting of carbon having one or more grooves or recesses formed in it adapted to be filled with a depolarizer, an electrolyte paste containing a base, capable of producing hydrogen and an oxide base by reactions within the cell a depolarizer in contact with the negative electrode consisting of sulphur iodide or equivalent substances which with the hydrogen and oxide base will form a compound incapable of further reaction within the cell, and a seal for sealing the entrance to the containing vessel.

3. In a galvanic cell, the combination of the holding vessel, with a positive electrode and a negative electrode, an electrolyte paste containing a base, capable of producing hydrogen and an oxide base by reactions within the cell, a depolarizer in contact with the negative electrode consisting of sulphur iodide or equivalent substances which with the hydrogen and oxide base will form a compound incapable of further reaction within the cell, a seal for sealing the entrance to the containing vessel, and a porous inert diaphragm interposed between the positive and negative electrodes and the electrolyte and depolarizer.

4. A sealed galvanic battery consisting of the combination of the inclosing vessel, a positive electrode of metal, a negative electrode of carbon, and an electrolyte consisting of a mixture of zinc oxide and aluminum chloride, a depolarizer surrounding the negative electrode consisting of iodine or a compound thereof substantially as set out, and a seal for hermetically sealing the vessel at its open end.

5. In a closed galvanic cell, the combination of the inclosing vessel, a positive electrode, a negative electrode, a single body of electrolyte for producing galvanic action between the electrodes, a depolarizer in contact with and for depolarizing the opposing surfaces of the negative electrode, an oxide base mixed with the electrolyte adapted to operate in conjunction with the depolarizer to form a salt and water and prevent the formation of gas, and a seal to hermetically seal the opening to the containing vessel.

6. In a galvanic battery, the combination of a containing vessel, a positive electrode of metal, a negative electrode of porous material having its face opposed to the positive electrode provided with recesses or grooves, an electrolyte in the form of paste in contact with the positive electrode, a depolarizer in a firm condition in contact with the porous negative electrode and within the recesses or grooves thereof, and a seal for the entrance of the containing vessel.

7. In a galvanic battery, the combination of a cylindrical containing vessel, a positive electrode of metal, a negative electrode of porous material arranged below the positive electrode, an electrolyte in the form of paste in contact with the positive electrode, a depolarizer in a firm condition in contact with the porous negative electrode, and a transverse interposed diaphragm of inert porous material between the electrolyte and the depolarizer extending to and in contact with the lateral walls of the containing vessel.

8. In a galvanic battery, the combination of the inclosing vessel, a positive electrode, a negative electrode, an electrolyte consisting of a mixture of zinc oxide and aluminum chloride in contact with the positive electrode, and a depolarizer consisting of iodine or a compound thereof in contact with the negative electrode.

In testimony of which invention I have hereunto set my hand.

EDWIN F. NORTHRUP.

Witnesses:
A. L. MILLER,
C. P. SHULL.